US012735548B2

(12) United States Patent
Burns et al.

(10) Patent No.: US 12,735,548 B2
(45) Date of Patent: Sep. 15, 2026

(54) PLASTIC RECYCLING

(71) Applicant: Reventas Limited, Livingston (GB)

(72) Inventors: Andrew Burns, Livingston (GB); Peter Malley, Livingston (GB); Steven Andrew Burns, Livingston (GB); Thomas Rose, Livingston (GB)

(73) Assignee: REVENTAS LIMITED, Livingston (GB)

( * ) Notice: Subject to any disclaimer, the term of this patent is extended or adjusted under 35 U.S.C. 154(b) by 730 days.

(21) Appl. No.: 18/022,558

(22) PCT Filed: Aug. 25, 2021

(86) PCT No.: PCT/EP2021/073529
§ 371 (c)(1),
(2) Date: Feb. 22, 2023

(87) PCT Pub. No.: WO2022/043392
PCT Pub. Date: Mar. 3, 2022

(65) Prior Publication Data

US 2024/0034854 A1 Feb. 1, 2024

(30) Foreign Application Priority Data

Aug. 26, 2020 (GB) .................................... 2013341
Jun. 25, 2021 (GB) .................................... 2109182

(51) Int. Cl.
*C08J 11/08* (2006.01)
*B01J 19/24* (2006.01)
*B32B 27/08* (2006.01)
*B82Y 30/00* (2011.01)

(52) U.S. Cl.
CPC ............. *C08J 11/08* (2013.01); *B01J 19/245* (2013.01); *B32B 27/08* (2013.01); *B82Y 30/00* (2013.01); *C08J 2323/06* (2013.01); *C08J 2323/12* (2013.01); *C08J 2323/16* (2013.01); *C08J 2423/06* (2013.01); *C08J 2423/12* (2013.01)

(58) Field of Classification Search
CPC ........... Y02W 30/62; B29B 2017/0203; B29B 2017/0293
See application file for complete search history.

(56) References Cited

U.S. PATENT DOCUMENTS 4,031,039 A 6/1977 Mizumoto et al.
9,803,035 B2 10/2017 Layman et al.
2003/0146547 A1* 8/2003 Fischer .................... C08J 11/08 264/340
2017/0203470 A1* 7/2017 Vesavkar ................ B29B 17/02
2024/0191051 A1* 6/2024 Albrecht ................. B29B 17/02

FOREIGN PATENT DOCUMENTS

CN 206199072 U 5/2017
CN 108890920 A 11/2018
CN 208911941 U 5/2019
EP 1829914 A1 9/2007
GB 2547899 A 9/2017
JP S49-107070 A * 10/1974
JP 2019081142 A * 5/2019
WO 2016016623 A1 2/2016

OTHER PUBLICATIONS

Machine Translation of JP2019081142A. May 30, 2019. (Year: 2019).*
Machine Translation of JPS49-107070A. Oct. 11, 1974. (Year: 1974).*
Application EP21168640.7 Filed Apr. 15, 2021. (Year: 2021).*
Intellectual Property Office of the UK Patent Office; Search Report for GB2013341.9; Sep. 8, 2020; one page; Intellectual Property Office of the UK Patent Office, Newport, South Wales, United Kingdom.
Intellectual Property Office of the UK Patent Office; Combined Search and Examination Report for GB2013341.9; Sep. 9, 2020; one page; Intellectual Property Office of the UK Patent Office, Newport, South Wales, United Kingdom.
Intellectual Property Office of the UK Patent Office; Search Report for GB2112190.0; Oct. 22, 2021; one page; Intellectual Property Office of the UK Patent Office, Newport, South Wales, United Kingdom.
The International Bureau of WIPO, International Preliminary Report on Patentability for PCT/EP2021/073529; Feb. 28, 2023; six pages; European Patent Office, Rijswijk, The Netherlands.
Saudi Authority for Intellectual Property; Examination Report for application No. 523442160; Jun. 10, 2025; all pages; Saudi Authority for Intellectual Property, Riyadh, Kingdom of Saudi Arabia.
China Intellectual Property Administration; First Office Action for CN202180051918.7; Apr. 9, 2026; all pages; China Intellectual Property Administration; Receiving Section of the Chinese Patent Office, No. 6 Tucheng Road West, Haidian District, Beijing. Postal code: 100088.

* cited by examiner

*Primary Examiner* — Stephen E Rieth
(74) *Attorney, Agent, or Firm* — LAW OFFICE OF JESSE D. LAMBERT, LLC

(57) ABSTRACT

A method for the fractionation of reclaimed polymer in at least one solvent in a process for purifying reclaimed polymers plastic recycling to increase their use in secondary applications. The reclaimed polymer is dissolved in a solvent within a reactor vessel having a stack of perforated discs which are oscillated. The linear motion of the stack speeds up dissolution time to minutes rather than hours and the required polymer to solvent ratio can be increased to 0.3 to 10% wt addition. Temperature and time effects are used to fractionate polymers of differing molecular weights to provide purified and graded plastics for secondary use at a commercially viable scale.

19 Claims, 3 Drawing Sheets

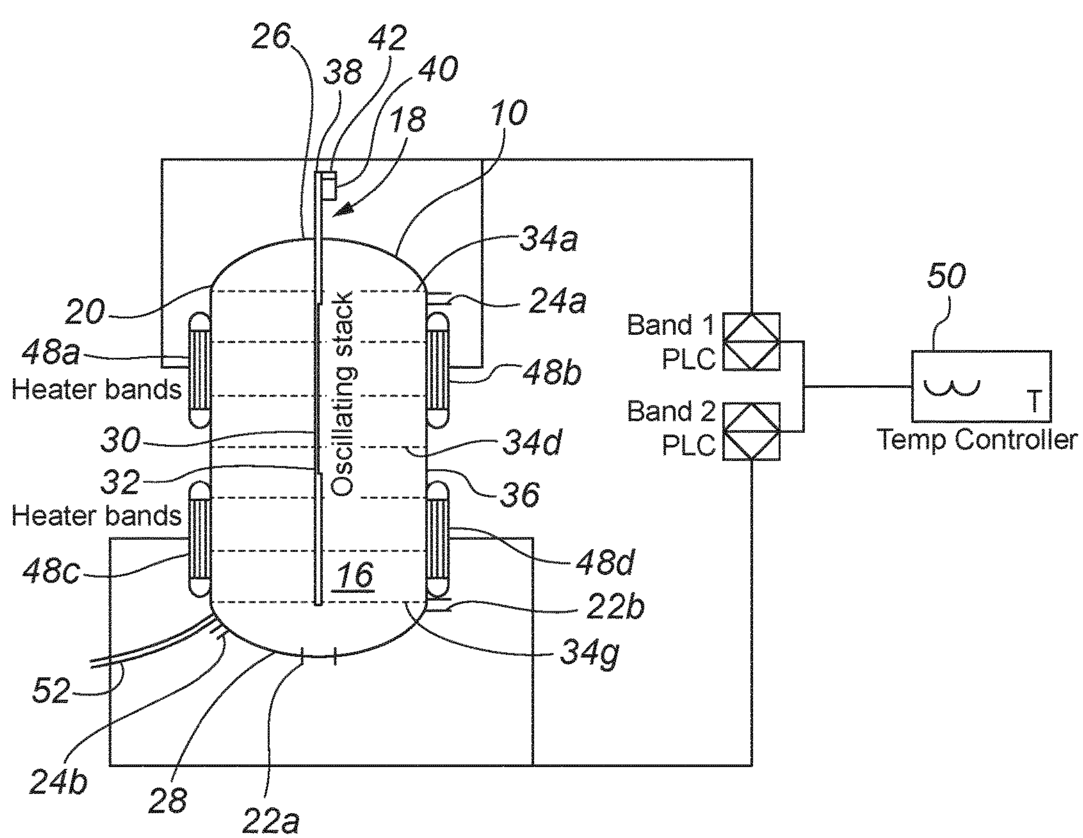
Fig. 2
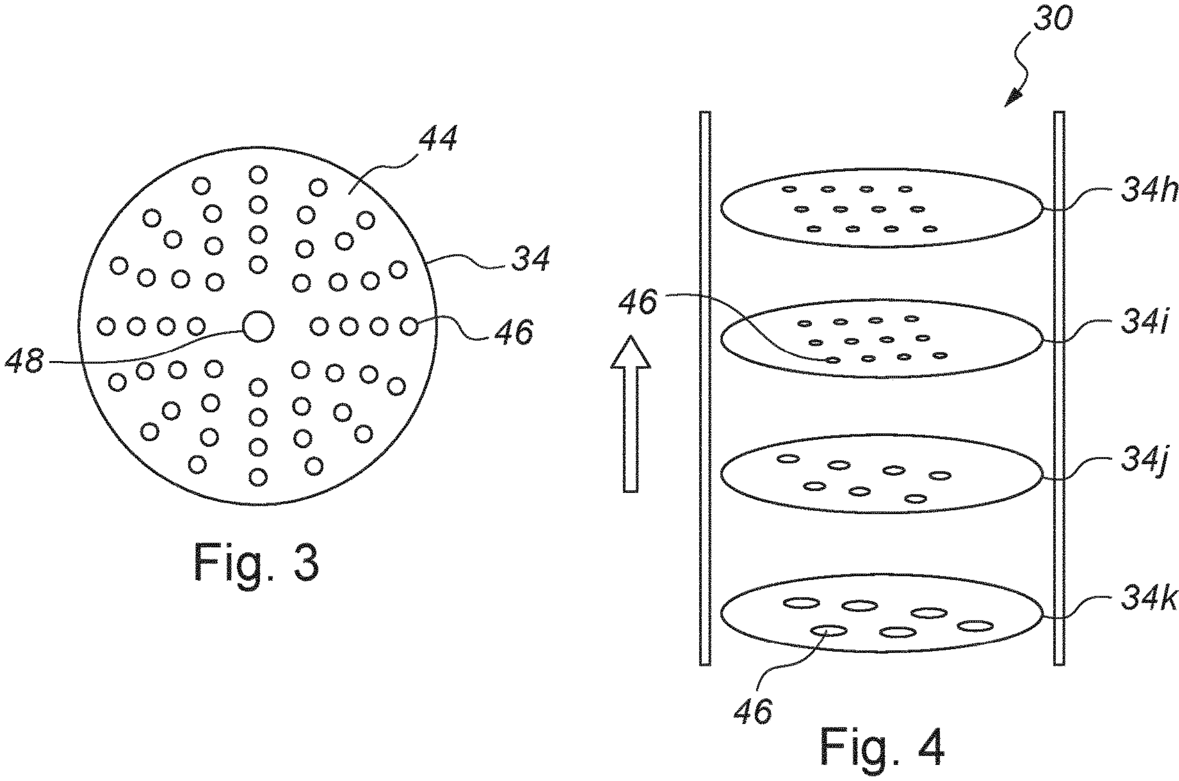
Fig. 3
Fig. 4

PLASTIC RECYCLING

The present invention relates to plastic recycling and more particularly, to a method for the fractionation of polymers in solvents in a process of purifying reclaimed polymers to increase their use in secondary applications.

Recycling of waste materials has now become a major environmental driver. In this regard the recycling of plastics is placed high on the agenda as these are non-biodegradable. To recycle plastics requires the plastics waste to be capable of being separated into the chemically distinct materials. As a result many techniques have been proposed, primarily based on separating the different plastics by their density. Consequently, the known techniques use either gravity separation in flotation tanks or stirring to create a centrifugal force for separation. The most common plastics in waste are the polyolefins polyethylene (PE) and polypropylene (PP). In recycling they only have a value when the pure materials are recovered.

WO2016016623 describes a separation process which features the introduction of a least two different materials, in a segregation media such as water, into a vessel, and linear oscillation of an internal baffle. The motion of the baffle may help in the separation of the two materials, which may have similar densities. Typical material for separation may be polyethylene and polypropylene which may be in thin flake form, or mineral from ore. The action of the baffle may be referred to as shuggling. The baffle may feature a number of horizontally extending plates. There may be a recirculation channel for fluid in the vessel.

This is an inert process, with the segregation media typically being water, so that there is separation without degrading, dissolving, decomposing or depolymerizing the plastic polymer. Without such dissolution of the polymer plastic, the materials fed into the vessel cannot be further purified by separation or grading.

Accordingly, this process typically produces a mixed colour granulate. The colour limits the secondary application for recycled plastics as moulders and manufacturers have no choice in colour selection so any products are black, low value and out of sight. This, combined with additives and contaminants that can be present in recyclate, result in low resale value and recyclers can only extract value from a small percentage of material economically.

U.S. Pat. No. 9,803,035 discloses a method for purifying reclaimed polymers, such as polyethylene reclaimed from post-consumer use or post-industrial use to produce a colourless or clear, odour free, virgin-like polymer. The method involves obtaining the reclaimed polyethylene and contacting it at an elevated temperature and pressure with a fluid solvent to produce an extracted reclaimed polyethylene. The extracted reclaimed polyethylene is dissolved in a solvent at an elevated temperature and pressure to produce a polyethylene solution, which is purified at an elevated temperature and pressure by contacting the polyethylene solution with solid media to produce a purer polyethylene solution. A purer polyethylene is then separated from the purer polyethylene solution. The elevated temperatures are 90° C. to about 220° C. and elevated pressures from about 350 psig (2.41 MPa) to about 20,000 psig (137.90 MPa).

Such processes require the dissolution of the plastic in a solvent before the purification steps can take place. While the dissolution of polymers in solvents has been practiced for years at a laboratory and small batch scale, it is not suitable as a commercial process due primarily to the length of time it takes to dissolve polymers (hours). While it is known that undertaking the dissolution at elevated temperatures and pressures will allow for some decrease in the time, this is not significantly compensated for by the additional equipment and procedures required to control the pressure and temperature during dissolution on a commercial scale. A further disadvantage is seen in the quantity of solvent required, with a typical minimum polymer solvent ratio being 1:100.

While the process disclosed in U.S. Pat. No. 9,803,035 provides a purified polyethylene, which may be sourced from post-consumer waste streams, it can only be provided with mechanical and physical properties similar to input polymer material s. Such variation in the mechanical and physical properties, for example the density and melt index, of the purified polyethylene, limit it's uses in secondary applications where manufacturers are seeking a particular grade of polyethylene in terms of density and more particularly molecular weight.

It is therefore an object of the present invention to provide a method useful in purifying reclaimed polymers which obviates or mitigates one or more disadvantages in the prior art.

According to the present invention there is provided a method for the fractionation of at least one reclaimed polymer in at least one solvent in a process for purifying reclaimed polymers, comprising the steps:

(a) inputting at least one reclaimed polymer and at least one solvent into a reactor vessel: the at least one reclaimed polymer comprising first polymers having a molecular weight in a first range and second polymers having a molecular weight in a second range wherein the first range is lower than the second range;

(b) operating a mixing device within the reactor vessel for a first time duration;

(c) operating the reactor vessel at a first temperature;

(d) dissolving the first polymers in the solvent;

(e) fractionating the first polymers in solution from the second polymers;

(f) removing the first polymers from the vessel independent from the second polymers;

characterised in that, the mixing device comprises: a plurality of discs aligned parallel to each other in a stacked arrangement; each disc extending over a majority of the cross-sectional area of the reactor vessel and including a plurality of perforations to allow the mixture to flow from a first end of the reactor vessel to a second end of the reactor vessel, through the discs; one or more supports to hold the discs in position; and the one or more supports connected to a linear motion generator so that the discs are moved to oscillate at a first frequency and first amplitude, the linear motion dissolving at least the first polymers in the solvent in the first time duration.

It has been surprisingly discovered that by use of such a mixing device the time duration for dissolution is greatly reduced to minutes rather than hours and that the polymer to solvent ratio can also be increased. Thus the use of such a mixing device for separating out different size molecular weights via time or temperature effects on dissolving recycled polymers such as polyethylene can be achieved in a commercial manner.

Preferably, the method also comprises the steps:

(g) dissolving the second polymers in the solvent; and (h) recovering the second polymers.

In this way, the reclaimed polymer is separated by molecular weight to provide more useful and valuable higher grade recycled polymers.

Molecular weight can be characterised by the melt flow index (MFI) of the polymer. Examples of the typical fractions which can be created by this method may be: less than 0.2 melt index; 0.2-2 melt index; 2-30 melt index when carried out at 190° C. and 2.16 kg.

Preferably the first time duration is less than an hour. The first duration may be less than 30 minutes. The first duration may be less than 15 mins. More preferably the first duration is less than 10 minutes.

The at least one reclaimed polymer may be in the range of 0.1% to 100% wt addition. Preferably, the at least one reclaimed polymer is in the range of 0.1% to 20% wt addition. More preferably, the at least one reclaimed polymer is in the range of 0.3% to 10% wt addition. By being able to reduce the polymer solvent ratio to 1:20 or even 1:10, commercial use becomes economical. Reactor vessel volumes of 1,000 litres and greater can be realised.

Preferably the first frequency is in the range 1 to 15 Hz. Preferably the first amplitude is in the range 40 to 1000 mm. Tuning the frequency and amplitude can further reduce the first time duration.

Preferably, the method includes purging an inert gas into the reactor vessel to displace oxygen with an inert atmosphere. Preferably the inert gas is nitrogen.

Preferably, the method includes heating the mixture to the first temperature. Preferably the mixture is heated by heating the reactor vessel. Preferably the temperature is between room temperature and the at least one solvent boiling point. Alternatively, the solvent can be heated. Preferably the first temperature is between 100° C. and 120° C. More preferably the first temperature is 100° C. This is sufficient to dissolve the first polymers. Preferably the temperature is raised to a second temperature between 120° C. and 150° C. More preferably the first temperature is 120° C. This is sufficient to dissolve the second polymers. In this way, the temperature can be used to fractionate the polymers of differing molecular weights. Also by raising the temperature of the mixture, the first time duration can be reduced. The temperatures required are suitable for commercial application. Alternatively, a temperature gradient can be created along a length of the reactor vessel.

Preferably, the at least one reclaimed polymer is one or more polyolefins. This allows the system to work on a thermoplastic feedstock. Preferably, the at least one reclaimed polymer is polyethylene (PE) and/or polypropylene (PP). More preferably, the at least one reclaimed polymer is mixed PE/PP recyclate. Such recyclates are a typical product created for use in recycling. These are typically in the form of flakes.

The method may include a first step in which a mixed plastic feedstock is mechanically separated to remove contaminants. The contaminants may be considered as, but not limited to, polyvinyl chloride (PVC), polyethylene terephthalate (PET) and acrylonitrile butadiene styrene (ABS). Examples of reclaimed plastic polymers may be: single source end of life thermoplastics i.e. wheelie bins all colour, containers, pipe, bottle caps, bottles and tanks; post-consumer and post-industrial recycled plastics; mixed PE/PP recyclate; films i.e. multilayer films, laminate films, PE or PP films; and other mixed thermoplastics: ABS, Polystyrene, PVC.

Preferably the at least one solvent is butylal. More preferably one or more solvent is butylal/dibutoxymethane. This has found to be most effective but any solvent which operates on a polymer can be used. Other typical solvents may be xylene, toluene and ethyl benzene, for example. The method may include the step of selecting the at least one solvent for the polarity of the polymer as the solute and the solvent. It has been found that this factor affects the solubility of the polymer in the solvent.

Preferably the method is operated as a batch process. In this way the vessel is filled and emptied on a cyclic basis. Solvent may be flowed from a first end to a second end of the vessel. Alternatively, the method is operated on a continuous process.

Preferably, the plurality of discs are aligned parallel to each other in a vertical stack, with the mixture flowing vertically in the reactor vessel through the discs, and the discs are moved up and down at the first frequency and the first amplitude. In this way, the reactor vessel is vertically arranged. The discs may be considered as lying perpendicular to side walls of the reactor vessel, each on a horizontal plane. Preferably the reactor vessel is cylindrical to provide a cylindrical side wall. More preferably, the one or more supports is a single post aligned perpendicularly to the discs and parallel to the side wall at the centre of the vessel.

Preferably, the at least one reclaimed polymer and at least one solvent are inputted at a lower end of the reactor vessel. Preferably also, there is an output arranged higher up the vessel. In this way, the first polymers can dissolve and will travel up the vessel to be removed at the output.

Preferably the perforations in the plurality of discs decrease in size from a lowermost arranged disc to an uppermost arranged disc in the stacked arrangement. This can be used to prevent polymer flakes travelling up through the vessel until they have dissolved.

Alternatively, the plurality of discs are aligned parallel to each other in a horizontally stacked arrangement, with the mixture flowing along the reactor vessel through the discs, and the discs are moved back and forth at the first frequency and the first amplitude. In this way, the reactor vessel is horizontally arranged. The discs may be considered as lying perpendicular to side walls of the reactor vessel, each on a vertical plane. Preferably the reactor vessel is cylindrical to provide a cylindrical side wall. More preferably, the one or more supports is a single post aligned perpendicularly to the discs and parallel to the side wall at the centre of the vessel. Preferably there is an input at a first end of the vessel and first and second outputs spaced apart along the vessel. Preferably a mesh is arranged around the stack. In this way only dissolved polymer can exit the vessel.

The at least one reclaimed polymer and the solvent may be combined before being inputted to the reactor vessel. Alternatively, the at least one reclaimed polymer and the solvent are inputted to the reactor vessel. In this way the solvent can be pumped through the reactor vessel to aid transportation of dissolved polymer through the reactor vessel.

In an embodiment, step (g) is performed together with step (d), providing a complete solution of the at least one reclaimed polymer in the solvent. The method may then include the step of treating this complete solution to remove contaminants and/or additives before fractionation is performed. Such contaminants and/or additives may be selected from a group comprising: non-plastics, colour pigments, odours. The fractionation may be performed in the reactor vessel. Alternatively, the method may include the steps of treating the fractionated first polymers and/or second polymers in solvent to remove contaminants and/or additives.

The first polymers and the second polymers may be recovered from the solvent by drying. The recovered purified first and second polymers (typically containing 5% solvent or less) may be passed to an extruder where the polymer is pelletised and remaining volatile solvent removed and reused. The solvent may be distilled before re-use.

The individual features described above may be employed separately or in any suitable combination to produce the desired results.

In the description that follows, the drawings are not necessarily to scale. Certain features of the invention may be shown exaggerated in scale or in somewhat schematic form, and some details of conventional elements may not be shown in the interest of clarity and conciseness.

Accordingly, the drawings and descriptions are to be regarded as illustrative in nature, and not as restrictive. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

All numerical values in this disclosure are understood as being modified by "about". All singular forms of elements, or any other components described herein including (without limitations) components of the apparatus are understood to include plural forms thereof.

Embodiments of the present invention will now be described, by way of example only, with reference to the following drawings of which:

FIG. 2 is an illustration of a reactor vessel including a mixing device for use in the method according to an embodiment of the present invention;

FIG. 3 is an illustration of a disc for use in the mixing device and reactor vessel of FIG. 2;

FIG. 4 is an illustration of an oscillating stack for use in the mixing device and reactor vessel of FIG. 2;

Figure 1:
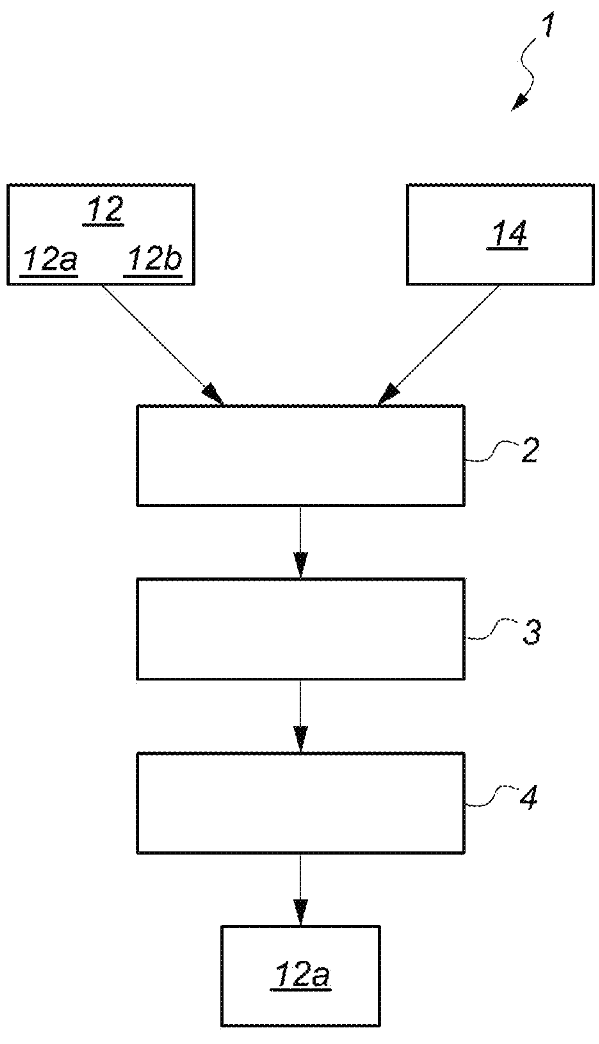
FIG. 1 is a flow chart illustrating the steps in a method for the fractionation of at least one reclaimed polymer in at least one solvent in a process for purifying reclaimed polymers according to a first embodiment of the present invention.

Reference is initially made to FIG. 1 of the drawings which illustrates a method for the fractionation of at least one reclaimed polymer in at least one solvent in a process for purifying reclaimed polymers, generally indicated by reference numeral 1, according to an embodiment of the present invention. In the method 1, in a first step 2 a reclaimed polymer 12 having first polymers 12*a* with a low molecular weight and second polymers 12*b* with a high molecular weight are combined with a solvent 14 in a reactor vessel 16. A second step 3 is to operate a mixing device in the vessel for a time period and at a first temperature, this will result in the dissolution of the first polymers 12*a* and they can be separated from the second polymers 12*b* by fractionation. This is the fractionation step. A third step 4 is to the removal of the first polymers 12*a* from the vessel. By use of a reactor vessel as described hereinafter, higher grade recycled plastic can be obtained by separating out plastic polymers by different weights via time and/or temperature effects on dissolving reclaimed plastic in a commercial manner.

Reference is now made to FIG. 2 of the drawings which illustrates a reactor vessel, generally indicated by reference numeral 10, for use in method for the fractionation of at least one reclaimed polymer in at least one solvent in a process for purifying reclaimed polymers, according to an embodiment of the present invention.

The reactor vessel 10 is substantially cylindrical having a height greater than its diameter. The capacity of the vessel 10 will be equal to or greater than 1,000 litres for commercial use. Those skilled in the art will recognise that a 2,000 to 3,000 litre vessel is practical, or a series of vessels. However, scaling to a 10,000 litre vessel can be done and even up to 30,000 litres. In this embodiment, there is a first input port 22*a* through which the solvent 14 and is introduced. While we will refer to the solvent 14, it will be understood that this may be a number of individual solvents which combine in the vessel 10. The first input port 22*a* is shown at the bottom of the vessel 10, though it may be at any location on the vessel, its position being dependent upon the method used. A second input port 22*b* is provided for the polymer 12. The second input port 22*b* is also at the bottom of the vessel 10, though it also could be at the top depending on the method selected. Typically the polymer 12 or combination of polymers, will most likely be a solid material, such as recyclate flakes or film, while the solvent 14 will be a liquid. The polymer 12 may be in the form of a melt stream if desired. Additionally, the polymer 12 and solvent 14 could be mixed to form the mixture 16 before being introduced to the vessel 10. In this case only a single input port would be required. A first output 24*a*, shown towards the top of the vessel 10, is used to remove the dissolved first polymers 12*a*. The second output 24*b* is arranged at a base of the vessel 10 and used to remove the second polymers 12*b*, though the number and positions of the outputs can be varied dependent upon the method selected.

Within the vessel 10, there is a mixing device, generally indicated by reference numeral 18, vertically arranged in the centre of the vessel 10, and extending between the top 26 and bottom 28 of the vessel 10. Mixing device 18 has a central shaft 32 upon which is located a number of discs 34(*a*)-(*g*). For illustrative purposes only seven discs 34 are shown. The discs 34 are mounted perpendicularly to the shaft 32 so that they are aligned parallel to each other and each radiates out through the vessel 10 to almost reach the side wall 36. The number and position of the discs 34 may be varied on the shaft 32, but in the preferred embodiment they are equally spaced. The arrangement may be considered as a stack 30. Stack is arranged vertically in the vessel 10.

The top 38 of shaft 32 is supported at the top 26 of the of the vessel 10 so that the mixing device 18 is suspended in the vessel 10. The shaft 32 is configured so that it may move up and down, moving longitudinally on its own central axis, vertically with respect to the vessel 10. The discs 34 are attached to the shaft 32 in such a way that they too, move up and down, longitudinally when the shaft 32 moves. Movement of the shaft 32, is achieved by use of an actuator linear movement motor 40 attached to the top end 38 of the shaft 32.

The motor 40 provides a linear movement to the shaft 32 on the central axis. The movement is a stroke, being a backward and forward motion, to extend the shaft 32 into the vessel 10 by a set distance, referred to as the amplitude. The frequency of the strokes can also be set, so that the shaft 32 acts like a piston, continuously moving the discs 34 up and down within the vessel 10. The movement of the discs 34 within the vessel 10 mixes the contents of the vessel 10, these being the mixture 16. This oscillation of the stack 30 can operate over a fixed time, it may be for short-repeated pulses or can be stopped and started between checks to determine the dissolution of the vessel contents. Note that the stack 30, shaft 32 and discs 34 do not rotate so there is no stirring action.

Oscillation of the stack 30 is controlled by circuitry 42 which operates the motor 40 and determines the amplitude and frequency required to obtain optimum time for dissolution of polymer in the solvent. The amplitude and frequency determine the energy introduced to the mixture 16 as will be described hereinafter.

The vessel contents, being the mixture 16 of polymer 12 and solvent 14, will be impacted by repeated contact with the discs 34. The discs 34 are designed to provide sufficient surface area 44 for contact with the vessel contents while still allowing the mixture 16 to move vertically through the entire length of the vessel 10 via perforations 46 through the discs 34.

FIG. 2 shows an embodiment for a disc 34. Disc 34 is circumferential, with a central port 48 through which the shaft 32 is located and attached. A pattern of perforations 46 are arranged over the surface area 44 of the disc 34 creating multiple apertures through the disc 34. While the embodiment in FIG. 2 shows a regular pattern of perforations 46, they may be arranged randomly. There is also no requirement for perforations 46 to be aligned vertically between neighbouring discs when arranged in the vessel 10. Indeed it is better to mismatch the perforations 46 so that there are no pathways through the mixing device 18 which are parallel to the shaft 32.

The discs 34 are comparatively thin compared to the height of the vessel and may be considered as plates, though as said previously, they are not rotated as would occur if a disc was an impeller as found in typical mixing tanks. Equally the discs 34 of the present invention are in direct contrast to known baffle structures used in mixing tanks. Prior art baffle structures are typically vertically arranged bars or rods spaced equidistantly around the outer edge of the tank which are fixed in position and do not move during operation of the tank.

Referring to FIG. 4, there is illustrated an alternative stack 30*a*. The discs 34*h-k* have perforations 46 which decrease in size as travelling up the stack Stack 30*a* may be considered as a size exclusion stack as the perforations are sized to prevent plastic polymer flakes travelling up the stack until they are dissolved.

Arranged around the vessel are heater bands 48*a-d*. While four heater bands 48*a-d* are shown arranged in an upper and lower configuration, any configuration of heating elements may be used to heat the vessel 10 and thereby heat the mixture 16. Sensors (not shown) can be used to determine the temperature of the mixture 16 and vessel 10, so that the temperature of the heater bands 48*a-b* can be adjusted to control the overall heating temperature and the temperature gradient across the vessel 10 via a temperature control unit 50.

There is also a gas line 52, used to introduce an inert gas such as nitrogen into the vessel 10. The nitrogen or other inert gas is purged into the system to displace oxygen with an inert atmosphere.

The method is used in a process for purifying reclaimed plastics. Initial sorting can be undertaken to provide an ideal pure polyolefin feedstock for the polymer 12 input. Plastic feedstocks may be: single source end of life thermoplastics i.e. wheelie bins all colour, containers, pipe, bottle caps, bottles and tanks; post-consumer and post-industrial recycled plastics; mixed PE/PP recyclate; films i.e. multi-layer films, laminate films, PE or PP films; and other mixed thermoplastics: ABS, Polystyrene, PVC. Plastics can be sorted into individual materials, such as high-density polyethylene (HDPE) or poly(ethylene terephthalate) (PET), or mixed streams of other common plastics, such as polypropylene (PP), low-density polyethylene (LDPE), poly(vinyl chloride) (PVC), polystyrene (PS), polycarbonate (PC), and polyamides (PA). A mechanical separation step can then remove the ABS, polystyrene, PET and PVC. The preferred polymer 12 is polyethylene (PE) and/or polypropylene (PP). Current recycling methods can produce a mixed PE/PP recyclate which provides the polyolefin in the form of flakes which can be easily weight and introduced to the reactor vessel 10 in measured quantities. In the examples given herein PE is the polymer 12 in the forms of HDPE Roto moulding grade; HDPE Blow moulding grade; HDPE Extrusion grade (PE100-Pipe); LDPE; and LLDPE as would be recognised by those skilled in the art.

There are a large number of known solvents for use on polymers. A selected list from reference sources may include: 0-Dichloro benzene; 1,2,3,4-Tetrahydronaphthalene; 1,2-Dichloroethane; 1,4-Dioxane; 1,4-dioxane, acetone; Acetic acid; Acetic anhydride; Acetone; Acetonitrile; benzene; Benzyl alcohol; Bromobenzene; Butanone; butylglycol; Chloro benzene; Chloroform; Cyclohexane; Cyclohexanol; Cyclohexanone; Decahydronaphthalene; Dibutoxymethane; dibutyl ether; Dichlorobenzene; Dichloromethane; Diethyl ether; Diethylene glycol; Diisopropyl ether; Diisopropyl ketone; dimethyl formamide; dimethyl sulfoxide; Dimethyl sulfoxide; Dimethylformamide; Diphenyl ether; Ethanol; Ethyl acetate; Ethylbenzene; Ethylene carbonate; Ethylene glycol; Ethylglycol; Formamide; Formic acid; Glycerol; iso-Propanol; iso-Butanol; isopropanol; Kerosene; m-Cresol; Methanol; Methyl acetate; methyl ethyl ketone; Methyl isobutyl ketone; Methylcyclohexane; Methylene Chloride; Methyl-n-amyl ketone; N,N-Dimethyl acetamide; N,N-Dimethyl formamide; n-Butanol; n-Butyl acetate; n-Butyl chloride; n-Butyl ether; n-Decane; n-Heptane; n-hexane; n-Hexane; Nitro benzene; Nitroethane; Nitromethane; N-methylpyrrollidone; n-Propanol; Phenol; p-Xylene; Pyridine; 1,1,2,2-Tetrachloroethane; Tetrachloroethane; and tetrahydrofuran. In the example given, the solvent 14 is butylal. While a single solvent 14 is used for the example, it will be recognised that for a mixture of applicable solvents can be used instead of a singular solvent for dissolution. Additionally, a two-phase system of solvents can be used to preferentially dissolve different polymer materials.

The solvent 14 is introduced to the vessel 10, through the input port 22*a*. A measured amount of polymer 12 is introduced to the vessel 10, through the input port 22*b*. In the example, this is between 5 wt % and 30 wt %. The vessel 10 may be purged using an inert gas, such as nitrogen, to displace oxygen and create an inert atmosphere for the mixture 16. The mixing device 18 is operated to oscillate the discs 34 at a fixed frequency and amplitude. These values are between 1 and 15 Hz, and 40 to 1000 mm in our example. The linear motion causes dissolution of the polymer 12 in the solvent. At a fixed temperature, the lighter first polymers 12*a* will dissolve before the heavier second polymers 12*b*.

The process is assisted by heating the vessel 10 via the heater bands or heating elements 48. The temperature selected is below the solvent boiling point. Additionally, the temperature selected is below the polymer melting point, though an embodiment of the invention may be used wherein the polymer is introduced as a melt stream with the use of an amorphous polymer decreasing the dissolution time. In an example, for the polymer 12 being polyethylene, the temperature can be increased to between 100° C. and 120° C. to dissolve the first polymers 12*a* and then increased to between 120° C. and 150° C. to dissolve the second polymers 12*b*.

Use of the reactor vessel 10 and mixing device 18 speeds up the dissolution of the polymer 12 and thus the fractionation process. Table 1 provides scaled predictions for a 10,000 litre reactor vessel, based on experimental results from a 500 ml reactor vessel. Thus the time duration for 100% dissolution is shown in all cases to be under 12 minutes. When compared to the prior art processes, which take hours, this reduction in dissolution time is a distinct advantage in commercial recycling plants.

TABLE 1

Dissolution Times in maximum polyethylene wt % addition in Butylal

| PE | Wt % in Butylal | Dissolution 50% PE (min) | 75% PE (min) | 100% PE (min) |
|---|---|---|---|---|
| HDPE Roto moulding grade | 12 | 5 | 7 | 12 |
| HDPE Blow moulding grade | 15 | 5 | 7 | 12 |
| HDPE Extrusion grade (PE100-Pipe) | 15 | 4 | 6 | 10 |
| LDPE | 30 | 2 | 6 | 8 |
| LLDPE | 30 | 2 | 6 | 8 |

The process is also achieved without requiring the vessel to be placed under elevated pressures as for the prior art. However, it would be recognised by those skilled in the art that pressure could be applied to the vessel, say up to 5 atm (0.5 MPa), which will increase the internal temperature and therefore increase the solubility of the solvent and consequently further reduce the time duration. By using a pressure of 0.2 MPa, temperatures of up to 150° C. can be realised.

With the size exclusion stack 30*a* in the vessel 10, possible steps in a method for the fractionation of at least one reclaimed polymer in at least one solvent in a process for purifying reclaimed polymers, according to an embodiment of the present invention, may be:

(i) introduce the polymer 12 to the bottom of the reactor vessel 10 with the solvent 14;

(ii) operate the mixing device 18 so that baffled oscillation is used to begin to dissolve the polymer 12;

(iii) the lower molecular weight polymer 12*a* begins to dissolve and travels up through the stack 30*a;*

(iv) the higher molecular weight polymer 12*b* takes longer to dissolve and is trapped lower in the stack 30*a;*

(v) the discs 34*h-k* (though there may be any number) have holes sized to prevent flakes of polymer 12 travelling up through the discs with decreasing holes travelling up the stack 30*a;*

(vi) after a first time duration, the first polymer 12*a* at the top of the stack is in solution as the second polymer 12*b* is not yet dissolved and trapped further down the stack;

(vii) the polymer solvent mix 16 at the top is pumped out from the reactor vessel 10 at output 24*a*, collecting the lower molecular weight polymer 12*a*; and (viii) the higher molecular weight polymer 12*b* is continuously mixed until it is fully dissolved and can be pumped out at the bottom of the reactor vessel 10 at output 24*b*.

This is performed at a first temperature. However, the vessel 10 can also utilise a temperature gradient up the column preferentially encouraging the low molecular weight polymer 12*a* to dissolve at the bottom of the reactor vessel 10 and become fully dissolved by the top.

A flow of solvent 14 can be used travelling up the stack 30*a* to aid transportation of dissolved polymer upwards.

Once cycle is complete and the reactor vessel is empty, it can be refilled ready for the next batch.

This may be considered as size exclusion fractionation during dissolution.

The utilisation of the reactor vessel 10 with the mixing device 18, allows reclaimed plastics such as PE to be dissolved at a commercial level and separated by molecular weight to increase their value for secondary applications, all within economical time scales.

Using the vessel 10 as described in FIGS. 2 and 3, possible steps in a method for the fractionation of at least one reclaimed polymer in at least one solvent in a process for purifying reclaimed polymers, according to a further embodiment of the present invention, may be:

(i) introduce the polymer 12 to the bottom of the reactor vessel 10 with the solvent 14;

(ii) set the temperature using the heater bands 48 to a first temperature, being 100° C. say, to dissolve only low molecular weight first polymers 12*a;*

(iii) operate the mixing device 18 so that baffled oscillation is used to begin to dissolve the polymer 12;

(iv) the lower molecular weight first polymers 12*a* begin to dissolve;

(v) after a first time duration, the reactor vessel 10 is drained of the polymer/solvent 16 capturing the low molecular weight first polymers 12*a;*

(vi) the reactor vessel 10 is the refilled and the temperature to a second higher temperature, being 120° C. say, to dissolve the remaining high molecular weight material second polymers 12*b*.

This may be considered as temperature fractionation during dissolution. It is also a batch process.

The utilisation of the reactor vessel 10 with the mixing device 18, allows reclaimed plastics such as PE to be dissolved at a commercial level and separated by molecular weight using temperature to increase their value for secondary applications, all within economical time scales.

Once fractionated the method may include the steps of treating the fractionated first polymers and/or second polymers in solvent to remove contaminants and/or additives. Such contaminants and/or additives may be selected from a group comprising: non-plastics, colour pigments, odours. The can be done by filtering or contacting with a solid media at elevated temperatures and pressures.

The first polymers and the second polymers may be recovered from the solvent by drying. The recovered purified first and second polymers (typically containing 5% solvent) may be passed to an extruder where the polymer is pelletised and remaining volatile solvent removed and reused. The solvent may be distilled before re-use.

Possible steps in a method for the fractionation of at least one reclaimed polymer in at least one solvent in a process for purifying reclaimed polymers, according to a further embodiment of the present invention, may be:

(i) introduce the polymer 12 to the reactor vessel 10 with the solvent;

(ii) operate the mixing device 18 so that baffled oscillation is used to dissolve the polymer 12 in a first time duration;

(iii) remove the solution from the vessel 10;

(iv) treat the solution to remove contaminants and/or additives such as colour pigments;

(v) introduce the treated solution to a vessel;

(vi) Drop the temperature in the vessel to a first temperature, precipitating out the high molecular weight second polymers 12*b* as a solid/gel;

(vii) collect the solid fraction from the vessel leaving the remaining solution in situ;

(viii) Drop the temperature in the vessel to a second temperature, lower than the first temperature, further precipitating the remaining low molecular weight first polymers 12*a* from the solution; and (ix) collect the final fraction of first polymers 12*a*.

Step (ii) may include elevating the temperature and/or pressure to further speed up the dissolution.

This may be considered as temperature controlled fractionation after dissolution. It is also a batch process.

The utilisation of the reactor vessel 10 with the mixing device 18, allows reclaimed plastics such as PE to be dissolved at a commercial level and separated by molecular weight using temperature to increase their value for secondary applications, all within economical time scales.

Figures 5, 6:
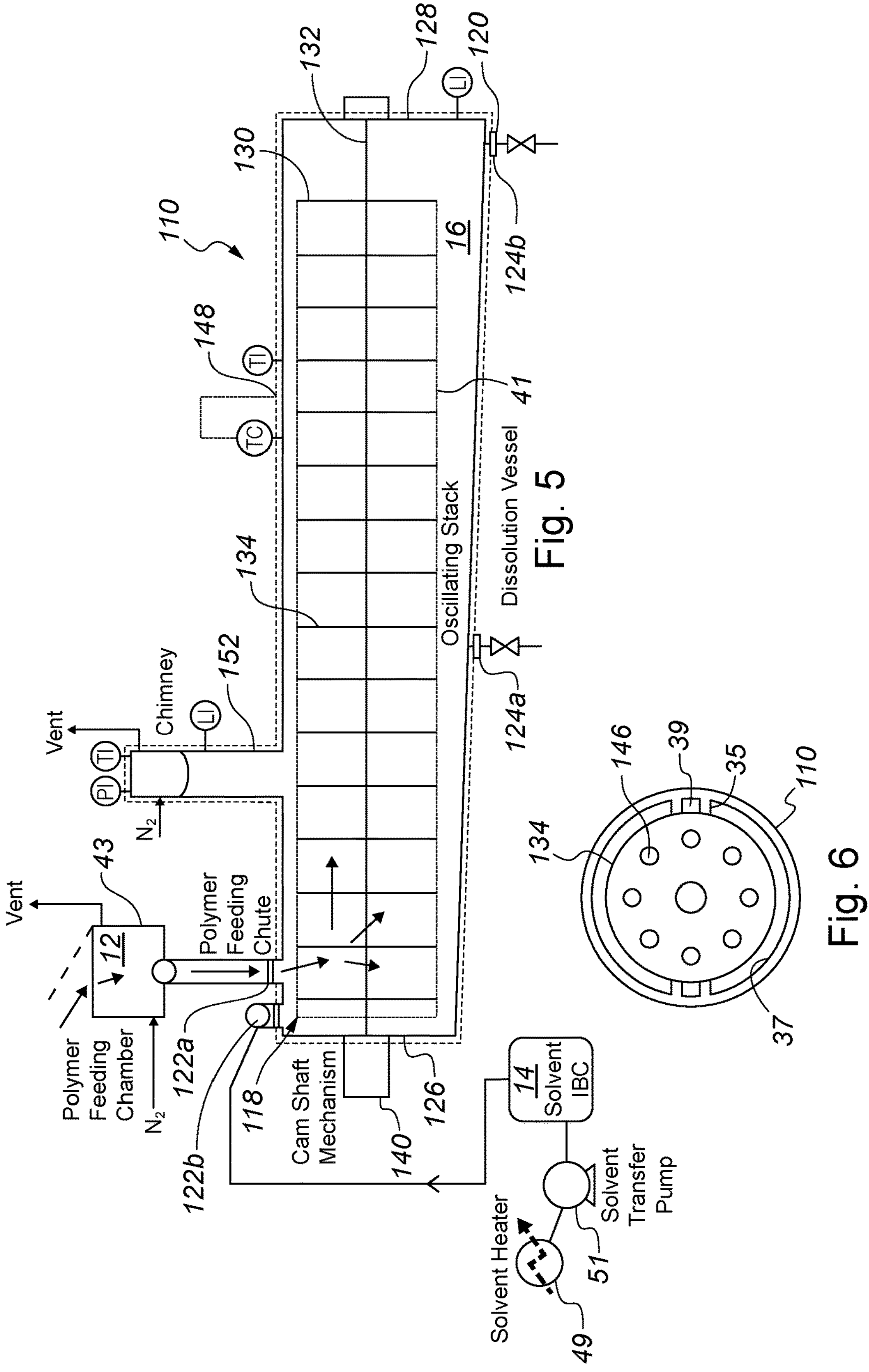
FIG. 5 is an illustration of a reactor vessel including an alternative mixing device for use in a method according to an embodiment of the present invention.
FIG. 6 is an illustration of a disc for use in the mixing device and reactor vessel of FIG. 4.

Reference is now made to FIG. 5 of the drawings which illustrates a reactor vessel, generally indicated 110, for use in method for the fractionation of at least one reclaimed polymer in at least one solvent in a process for purifying reclaimed polymers, according to an embodiment of the present invention.

Like parts to the features of FIGS. 2 and 3 have been given the same reference numeral with the addition of 100, to aid clarity.

The primary difference between vessel 10 and vessel 110 is that vessel 110 is arranged horizontally as compared to the vertical arrangement of vessel 10. More particularly the discs 134 in the vessel 110 are provided in a horizontal stack 130. The vessel 110 is a long thin vessel with a high length to diameter ratio.

Discs 134 are arranged in a horizontal stack 130 along the central shaft 132. While 16 discs 134 are shown this is illustrative and there may be any even or odd number of discs 134. The shaft 132 is supported at a first end 126 and a second end 128 by both end plates of the vessel 110. The reactor vessel 110 now has a length greater than its diameter. The discs 134 are as described for those with reference to FIG. 2, with the perforations 146 now allowing liquid to flow horizontally through them. It will be appreciated that the discs 134 might be mounted perpendicularly to the shaft 132 or at a slight angle. Due to the horizontal arrangement, guide rails 35 (see FIG. 6) on the internal walls 37 of the vessel 110 are provided to support the stack 130 and aid with sliding in and out the mixing device 118. Protrusions 39 on each an edge of a disc 134, slot into the guide rail 35 along length of vessel 110. The stack 130 and discs 134 are free to move back and forth within the guide rail 35.

As illustrated in FIG. 5, the vessel 110 need not be cylindrical but may be of any shape. The vessel 110 is advantageously shaped with a taper to provide a low point at which an output 124*b* is positioned. A further output 124*a* is provided approximately half way along the vessel, but outputs could be arranged at any position as the solution could be extracted throughout the height of the reactor vessel 110. In FIG. 6, as the discs 134 do not extend to the internal walls 37, a mesh 41 with specific pore size is wrapped around the stack 130. The mesh is made of stainless steel, PTFE or other suitable material which will not chemically interfere with the polymer 12 or solvent 14. The mesh 41 is a perforated sheath which contains undissolved solids of a but allows passage of solvent 14 and dissolved solvent polymer mixture 16.

The linear motion generator 140 is now located at one of the end plates 26,28 of the vessel 110, so that the mixing device 118 is moved back and forth to oscillate along the central shaft 132 on its own axis. As with the first embodiment, the shaft 132 is not turned and the guide rails 35 prevent any rotation of the discs 134.

Input 122*a* for the polymer 12 has a polymer loading chamber 43. Chamber 43 allows a polymer feedstock to be purged, with nitrogen say, to remove oxygen in a sealed enclosure. The chamber 43 is kept a distance from the vessel 110 to ensure the temperature-controlled heating jacket 148 does not melt the contents of the chamber 43. The gas line 152 is provided in combination with a chimney. The gas line 152 is used to introduce an inert gas, preferably nitrogen to purge the vessel 110 and maintain pressure during draining, though the vessel 110 can be filled with liquid with no head space, or with a head space filled with an inert gas e.g nitrogen.

The input 122*b* for the solvent 14 is located at the same end as the input 122*b*. The solvent 14 can be preheated before it is fed into the vessel 110 via a heater 49 and pump 51, or it might be heated in the vessel 110. An operating temperature for the vessel 110 may in the range 80-140 degrees Celsius, although this could be raised to 200 degrees Celsius depending on solvent 14 used. An operating pressure will preferably be in range 0.1-1.5 bar, but it can be higher. Vessel 110 works in a similar fashion to vessel 10 as described hereinbefore.

Features of the vessels 10,110 and mixing devices 18,118 between the embodiments shown in FIGS. 2 to 6 may be interchanged.

Use of the vessel 110 and mixing device 118 provides a continuous process for a method for the fractionation of at least one reclaimed polymer in at least one solvent in a process for purifying reclaimed polymers, according to a further embodiment of the present invention.

A hot solvent 14 at 110° C. to 150° C. is fed in through one end of the horizontal vessel 110 at input 122*b*, pump through the vessel and out of outlet 124*b* at the opposite end 128. Polymer 12 is fed in to the end at input 122*a*, being the same end as where the solvent 14 is being fed. The solvent/polymer mix 16 moves via plug flow to the outlet 124*b* end 128 of the dissolution vessel 110. The temperature is set to a first temperature so the polymer mix 16 dissolves in a known time and the plug flow speed is set to enable dissolution before the polymer 12 reaches the outlet 124*b*. The polymer 12 has a range of different molecular weights which dissolve in the solvent 14 at different rates. The dissolution rate is selected so that first polymers 12*a* will dissolve an the flowing mixture 16 and exit through the mesh 41 at a position of an outlet 124*a*, where they can be collected. Further passage through the vessel 110 will cause the higher molecular weight second polymers 12*b* to dissolve before they reach the end output 124*b*.

In one example, it may be arranged with low/mid-range molecular weight first polymers 12*a* dissolving in 4 minutes while the higher molecular weight second polymers 12*b* dissolve in 8 minutes at a chosen first temperature. If the vessel is 20 L in volume and solvent 14 is pumped in at 2 L/min then there will be a residence time of 10 minutes for the solvent 14 in the vessel 110. If polymer 12 is added at 200 cm$^3$/min (10% solution) then by the time the low/mid-range molecular weight first polymers 12*a* reach half-way they will be fully dissolved. If we therefore have two exit points 124*a,b* for the solvent 14, one half way down 124*a* and one at the end 124*b* opposite to the feed 122*b*, then the medium molecular weight first polymers 12*a* can be taken off at the centre point 124*a* with the higher molecular weight second polymer 12*b* taken off at the end 124*b*. In order to stop the high molecular weight second polymer 12*b* exiting at the centre point 124*a* in an undissolved form, the oscillating stack 30 is surrounded by a coarse mesh 41 and the polymer 12 is fed inside this mesh 41. In this way, only dissolved material can get out and exit the centre offtake. One further embodiment of this method is to heat the 2nd half of the vessel (after the centre point 124*a*) to a higher temperature 148 to effect faster dissolution of the higher molecular weight fractions 12*b*.

This may be considered as time-controlled fractionation during dissolution. It is a continuous process.

The utilisation of the reactor vessel 110 with the mixing device 118, allows reclaimed plastics such as PE to be dissolved at a commercial level and separated by molecular weight using time and temperature to increase their value for secondary applications, all within economical time scales.

The first and second polymers in solution may be treated as hereinbefore described to provide pellets most useful for processing by manufacturers into recycled plastic products.

It will be recognised that while the method describes the at least one reclaimed polymer with first and second polymers of differing molecular weight ranges, the method and apparatus can be adapted to process reclaimed polymer with a greater number of differing molecular weight ranges, depending on the purity and grade of recycled plastic output required.

The principal advantage of the present invention is that it provides a method for the fractionation of at least one reclaimed polymer in at least one solvent in a process for purifying reclaimed polymers which reduces the dissolution time from hours to minutes.

A further advantage of the present invention is that it provides a method for the fractionation of at least one reclaimed polymer in at least one solvent in a process for purifying reclaimed polymers which reduces the polymer to solvent ratio required.

A yet further advantage of at least one embodiment of the present invention is that it provides a method for the fractionation of at least one reclaimed polymer in at least one solvent in a process for purifying reclaimed polymers can be used in commercial processes with reactor vessel volumes in excess of 1,000 litres.

It will be appreciated by those skilled in the art that modifications may be made to the invention herein described without departing from the scope thereof. For example, other chemicals can be added to the mixture in the vessel such as an antioxidant to prevent degradation.

We claim:

1. A method for the fractionation of at least one reclaimed polymer in at least one solvent in a process for purifying reclaimed polymers, comprising the steps:

(a) inputting at least one reclaimed polymer and at least one solvent into a reactor vessel to create a mixture in the vessel: the at least one reclaimed polymer comprising first polymers having a molecular weight in a first range and second polymers having a molecular weight in a second range wherein the first range is lower than the second range;

(b) operating a mixing device within the reactor vessel for a first time duration;

(c) operating the reactor vessel at a first temperature;

(d) dissolving the first polymers in the solvent;

(e) fractionating the first polymers in solution from the second polymers;

(f) removing the first polymers from the vessel independent from the second polymers;

(g) passing recovered purified first and second polymers to an extruder where the polymer is pelletised and remaining volatile solvent removed;

characterised in that, the mixing device comprises: a plurality of discs aligned parallel to each other in a stacked arrangement; each disc extending over a majority of the cross-sectional area of the reactor vessel and including a plurality of perforations to allow the mixture to flow from a first end of the reactor vessel to a second end of the reactor vessel, through the discs; one or more supports to hold the discs in position; and the one or more supports connected to a linear motion generator so that the discs are moved to oscillate at a first frequency and first amplitude, the linear motion dissolving at least the first polymers in the solvent in the first time duration.

2. A method according to claim 1, also comprising the steps:

(g) dissolving the second polymers in the solvent; and (h) recovering the second polymers.

3. A method according to claim 2 wherein step (g) is performed together with step (d), providing a complete solution of the at least one reclaimed polymer in the solvent, the method then including the steps of treating this complete solution to remove contaminants and/or additives, before steps (e), (f) and (h) are performed.

4. A method according to claim 3 wherein step (h) is performed ahead of step (f) by dropping the temperature with the first temperature being higher than the second temperature to fractionate the second then the first polymers by precipitation.

5. A method according to claim 1 wherein the first time duration is selected from a group consisting of time intervals of: less than 60 minutes, less than 30 minutes, and less than 15 minutes.

6. A method according to claim 1 wherein the reactor vessel has a volume of 1,000 litres or greater.

7. A method according to claim 1 wherein the first frequency is in the range 1 to 15 Hz.

8. A method according to claim 1 wherein the first amplitude is in the range 40 to 1000 mm.

9. A method according to claim 1 wherein the method includes heating the mixture to the first temperature, the first temperature being between 100° C. and 120° C., to dissolve the first polymers.

10. A method according to claim 9 wherein the method includes the step of raising the temperature to a second temperature, the second temperature being between 120° C. and 150° C., to dissolve the second polymers.

11. A method according to claim 1 wherein the at least one reclaimed polymer is one or more polyolefins.

12. A method according to claim 11 wherein the at least one reclaimed polymer is polyethylene (PE) and/or polypropylene (PP).

13. A method according to claim 1 wherein the at least one solvent is selected from a group consisting of: butylal, xylene, toluene and ethyl benzene.

14. A method according to claim 1 wherein the at least one solvent is pumped through the reactor vessel from a first end to a second end of the reactor vessel.

15. A method according to claim 14 wherein the method is operated as a continuous process.

16. A method according to claim 15 wherein the plurality of discs are aligned parallel to each other in a horizontally stacked arrangement, with the mixture flowing along the reactor vessel through the discs, the discs are moved back and forth at the first frequency and the first amplitude, the at least one reclaimed polymer and the at least one solvent are input at a first end of the vessel, a plurality of outputs are arranged along a length of the vessel and a mesh is arranged around the stack, so that only dissolved polymer can exit the vessel at the plurality of outputs.

17. A method according to claim 1 wherein the method is operated as a batch process.

18. A method according to claim 1 wherein the plurality of discs are aligned parallel to each other in a vertical stack, with the mixture flowing vertically in the reactor vessel upwards through the discs.

19. A method according to claim 1 wherein the removed volatile solvent is reused.

* * * * *